July 13, 1948. J. B. BRENNAN 2,444,914
ELECTROLYTIC DEVICES AND METHODS OF MAKING SAME
Filed May 22, 1941 2 Sheets-Sheet 1
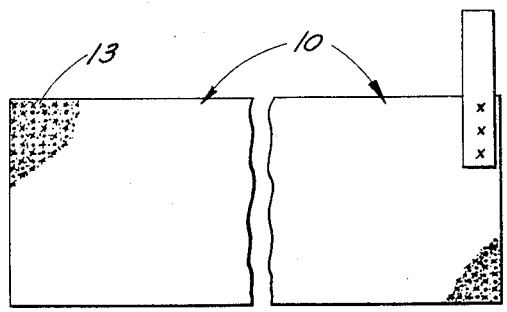
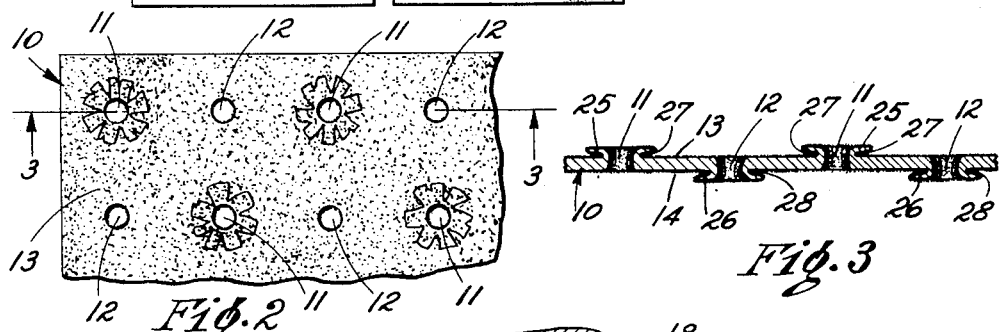
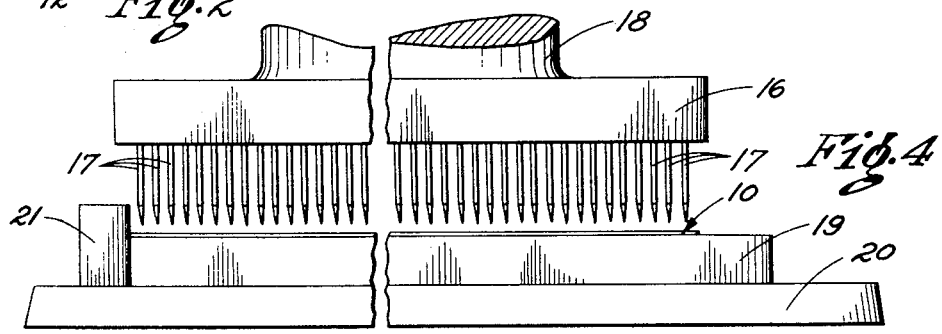
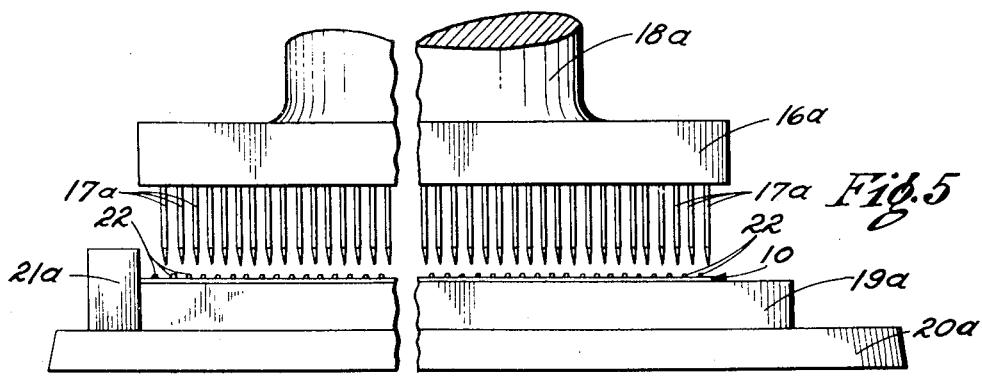
INVENTOR.
JOSEPH B. BRENNAN
BY Bosworth & Sessions
ATTORNEYS July 13, 1948.  J. B. BRENNAN  2,444,914
ELECTROLYTIC DEVICES AND METHODS OF MAKING SAME
Filed May 22, 1941  2 Sheets-Sheet 2
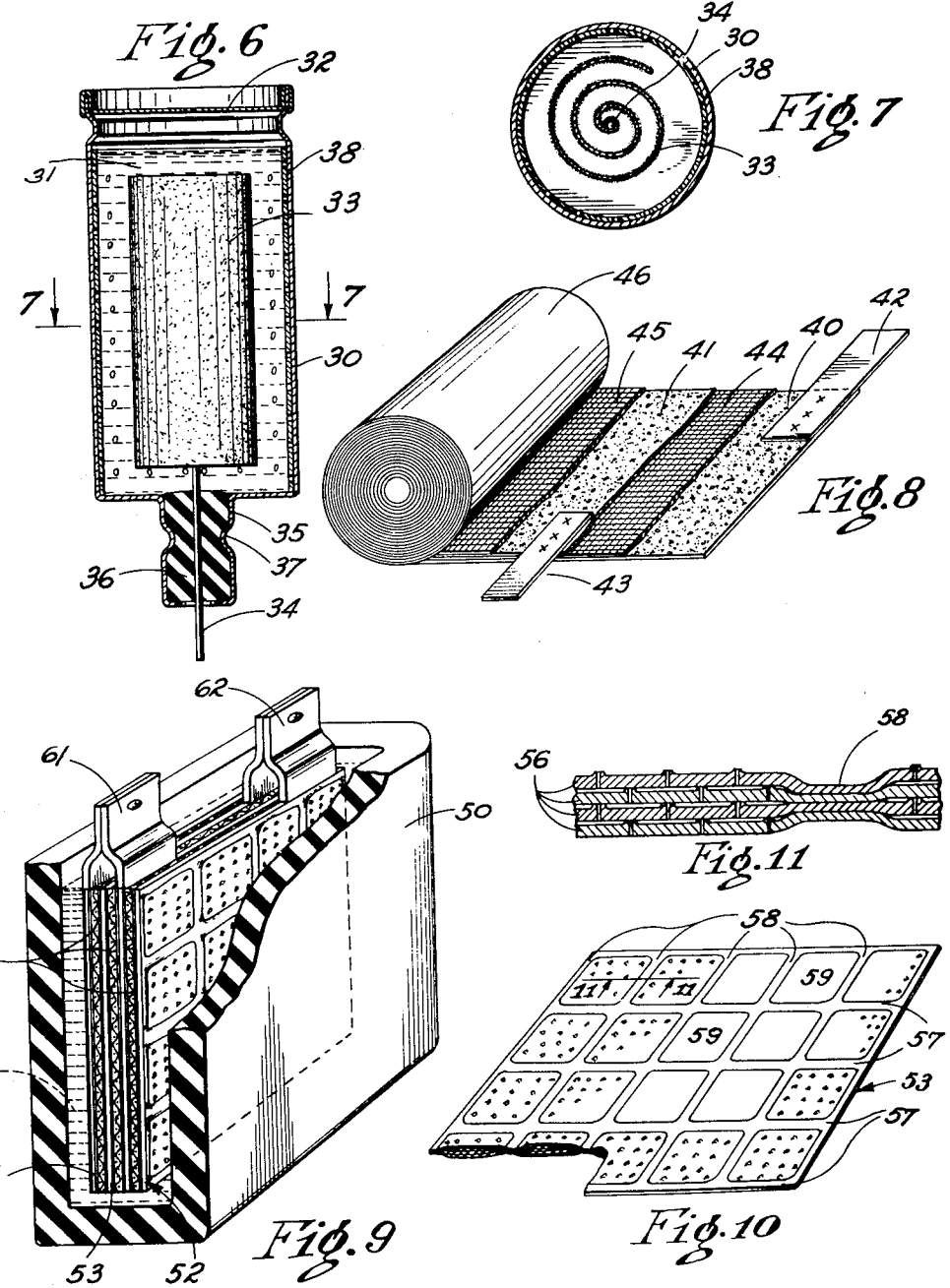
INVENTOR.
JOSEPH B. BRENNAN
BY Bosworth + Sessions
ATTORNEYS Patented July 13, 1948

2,444,914

UNITED STATES PATENT OFFICE 2,444,914

ELECTROLYTIC DEVICE AND METHOD OF MAKING SAME

Joseph B. Brennan, Euclid, Ohio, assignor to Everett D. McCurdy, trustee

Application May 22, 1941, Serial No. 394,664

13 Claims. (Cl. 175—315)

This invention relates to electrodes and methods of making same and more particularly to electrodes of the type having active surfaces of spray deposited metal such as are employed in electrolytic condensers, storage batteries, and the like.

In my prior Patents No. 2,104,018 and No. 2,104,019 issued January 4, 1939, I described and claimed electrodes suitable for use as anodes and cathodes, respectively, in electrolytic condensers and in my application Serial No. 199,396 filed April 1, 1938, now Patent No. 2,251,913, issued August 12, 1941, I described electrodes for storage batteries, particularly those of the alkaline type, all of the said electrodes including surfaces of spray deposited metal. In some respects the present invention constitutes an improvement on the disclosures of the aforesaid patents and application and it is a general object of my invention to provide electrodes for electrolytic devices which are of high efficiency and extensive surface area and which can be manufactured efficiently and economically. Another object is to provide an economic and efficient method of manufacturing such electrodes. A further object is to provide an electrode comprising a metallic sheet having a spray deposited layer thereon wherein the spray deposited layer is keyed firmly to the sheet. Another object is to provide an electrode embodying a metallic sheet and a spray deposited layer thereon wherein provision is made for the circulation of electrolyte through and about the electrode and thus to provide a better circulation of electrolyte and a free flow of ions within the cell in which the electrode is incorporated. A further object is to provide an electrode which will effectively retain an electrolyte paste or other active material in proper position within an electrolytic device. Another object is to provide a simple and efficient method for making electrodes which attain the foregoing objects.

Further objects and advantages of my invention will become apparent from the following description of preferred forms thereof, reference being made to the accompanying drawings. The essential characteristics are summarized in the claims.

Briefly, my invention contemplates the production of electrodes consisting of spray deposited layers on bases of sheet material such as thin foil in which the sheet material is pierced by a large number of openings, the piercing operation preferably being carried out before the spraying operation. By the piercing operation, which is preferably done by means of sharp needles which form openings through the foil without removing any substantial amount of material therefrom, the base material is made porous to permit the desired circulation of electrolyte and flow in ions. The piercing operation is preferably carried out so that small projections are drawn out of the foil surrounding each pierced opening. Thus, substantially none of the material of the foil is lost and, in fact, the effective area is apparently increased by the piercing operation. Further, the operation results in a considerable stiffening of the foil base so that a very light foil, for example, of the order of .002 of an inch in thickness will have sufficient strength for many purposes. The small projections have the additional important function of acting as keys or bonds to retain the spray deposited layers securely in position on the foil surface, while the sprayed material lines the small pierced openings, thus connecting the sprayed layers on opposite sides of the sheet and enclosing the layers, with the result that the spray deposited layers are not displaced or cracked during subsequent operations of fabricating the electrodes even though the electrodes be subjected to considerable bending, and the layers will be retained in position throughout the life of the device. The underlying foil insures that current densities will be substantially equal throughout the sprayed surfaces, thus the entire area of the electrodes will be effectively utilized.

Referring to the drawings, which are necessarily somewhat diagrammatic, Fig. 1 is a plan view of an electrode embodying my invention; Fig. 2 is a greatly enlarged view of a portion of the electrode illustrated in Fig. 1; Fig. 3 is a sectional view of the electrode illustrated in Figs. 1 and 2, the section being taken along the line 3—3 of Fig. 2; Fig. 4 diagrammatically illustrates one step in a preferred method of making my electrodes; Fig. 5 diagrammatically illustrates a subsequent step in the method; Fig. 6 is a vertical section through a wet type electrolytic condenser embodying an electrode made according to my invention; Fig. 7 is a transverse section through the condenser illustrated in Fig. 6 as indicated by the line 7—7 of Fig. 6; Fig. 8 illustrates a paste type condenser embodying electrodes made according to my invention, the condenser being partially unrolled to show the internal construction thereof; Fig. 9 is a perspective view illustrating a storage battery of the alkaline type embodying electrodes made according to my invention; Fig. 10 is a perspective, partly in section, of a preferred form of electrode for the storage battery shown in Fig. 9;

and Fig. 11 is a fragmentary section on a scale taken along line 11—11 of Fig. 10.

As shown particularly in Figs. 1 to 3, inclusive, an electrode made according to my invention may comprise a base of thin metallic foil 10 provided with a large number of pierced openings 11 and 12 therein and having spray deposited layers 13 and 14 on both sides thereof. The openings 11 and 12 are preferably produced as illustrated diagrammatically in Figs. 4 and 5, the apparatus consisting of a plate 16 having a large number of needles 17 mounted therein, the plate being forced downwardly to force the needles through the foil as by a punch-press (not shown) engaging the plunger 18. During the piercing operation the foil is preferably supported by a rubber pad 19 mounted on a plate 20. The foil may properly be positioned with respect to the pad and the needle 17 by any convenient gauge or stop such as the stop 21. Other piercing means may be employed, for example, the foil may be passed between a roll carrying a large number of needles, and a rubber covered roll.

In carrying out the piercing operation the sharp pointed needles do not remove any substantial amount of material but produce small openings, each of which is surrounded by an extruded or drawn portion having somewhat ragged or torn edges. Preferably the openings are formed by piercing from both sides of the foil; thus, the unpierced foil is placed in the apparatus shown in Fig. 4 and there subjected to the first piercing operation, then the foil is turned over so that the small projections 22 formed in the first operation and surrounding the openings 11 will project upwardly as shown in Fig. 5 and subjected to another piercing operation, preferably in an apparatus such as that illustrated in Fig. 5. This apparatus may be identical in all material respects with that shown in Fig. 4 and preferably consists of a die plate 16a, needles 17a, plunger 18a, rubber pad 19a supported on a base 20a, and a gauge or stop 21a. The gauge 21a is arranged so that when the foil is positioned in engagement with it, the needles 17a are disposed between the openings 11 and projections 22 formed in the previous operation. The needles 17a are adapted to be forced through the foil by the punch press to produce the downwardly extending openings 12 shown in Figs. 2 and 3.

After the piercing operation has been completed, the pierced foil is then preferably, but not necessarily, subjected to a light pressure between flat plates or smooth rolls to flatten down the minute projections 22 and the similar projections 23 produced in the second piercing operation. The pressing operation gives an appearance such as that illustrated in Figs. 2 and 3 to the minute openings, the openings 11 being surrounded on the top of the sheet of foil with minute flanges shown in an enlarged scale at 25, the edges of the flanges ordinarily being somewhat ragged or torn as illustrated in Fig. 2. Similar flanges formed around the openings 12 are indicated at 26. It is to be noted that the flange portions 25 and 26 are not forced into intimate contact with the metal of the foil, there ordinarily being small spaces as indicated at 27 and 28 between the flanges 25 and 26 and the adjacent surface of the foil.

After the piercing and rolling operations have been completed, the foil may be washed if necessary and then subjected to a spraying operation such as that described in my prior patents aforesaid, and which may be carried out by a conventional metalizing apparatus, the sprayed metal being deposited in very finely divided form and in a thin layer, producing the layers 13 and 14 indicated diagrammatically in Figs. 1 to 3. As shown particularly in Fig. 3, the minute flanges surrounding the pierced openings function to key the sprayed layers to the underlying foil surfaces, the sprayed metal extending beneath the flanges as well as above them. The projections surrounding the openings, whether or not they are pressed as shown in the drawing, are highly advantageous in this regard for while the sprayed layers are themselves coherent, it is sometimes difficult to secure proper adherence of the minute particles to the underlying base materials with the result that the sprayed material may become loosened from the base material in some areas during subsequent fabrication of the electrodes; however, with electrodes made according to my invention, the minute projections surround the pierced openings effectively retain the sprayed layers in place on the underlying foil surfaces with the result that the material can be bent or folded into almost any desired form without damage to or displacement of the sprayed layers and, further, the sprayed layers will remain firmly in position during the entire life of the device in which the electrode is incorporated. In some instances it may be desirable to subject the pierced foil to a sandblasting or etching operation before spraying, to further improve the adhesion of the sprayed layer to the foil.

Preferably my electrodes are provided with very large numbers of pierced openings, for example, the needles may be mounted on the plate 17 at spacings of about 20 to 25 to the inch so that the first piercing operation will produce from 400 to 625 openings per square inch of electrode and the needles 17a may have a similar spacing so that the total number of openings produced by the two piercing operations may be from 800 to 1250 openings per square inch of electrode. The large number of pierced openings makes possible the ready and easy circulation of electrolyte and the free flow of ions which result in increased efficiency and reduced resistance and power factor losses in devices in which my electrodes are incorporated. The pierced openings are particularly advantageous in this regard, for by producing the openings without removing any material, none of the area is lost, in fact, the piercing operation, because of the drawing or extruding effect of the needles, has the effect of increasing the area of the foil to a slight extent and the area of the openings themselves further gives an increase in surface area on which the finely divided metal particles are deposited. Thus, my method produces electrodes which are not only highly efficient and have highly advantageous electrical characteristics, but which are of very great effective area considering the amount of foil initially employed.

In Figs. 6 to 9, inclusive, I have illustrated typical electrolytic devices in which electrodes made according to my invention may be incorporated. These illustrations are given merely by way of example as those skilled in the art will appreciate that the electrodes may be used in conjunction with various other types of electrolytic condensers, accumulators, and the like.

As shown in Figs. 6 and 7, a wet type condenser embodying an electrode made according to my invention but otherwise of conventional design may comprise a container 30 for the electrolyte 31, the container also serving as the cathode of the condenser. The upper end of the container is preferably closed by a closure member 32 of conventional form preferably embodying a vent for permitting the escape of gases generated during the operation of the condenser. The anode 33 is immersed in the electrolyte and is preferably supported within the container by a riser 34 projecting downwardly through the hollow neck portion 35 of the container, the opening through the neck being sealed by a rubber grommet 36 which is compressed between the deformed sleeve portion 37 of the neck and the riser 34. The anode 33 is illustrated herein as being a sheet of aluminum foil welded or riveted to the riser 34 and bent into a spiral as shown particularly in Fig. 7 so that a comparatively large area may be contained within a comparatively small container. Accidental contact between the anode and the inner surface of the container 30 may be prevented by a perforated insulating spacer member 38.

The anode 33 is preferably formed of a base of high purity aluminum foil about two to five thousandths of an inch in thickness pierced as described above, there being from 800 to 1250 pierced openings per square inch of anode surface. The anode is provided with spray deposited aluminum coatings on either side thereof. The spraying operation may be carried out with the apparatus of the type shown in my Patent No. 2,104,018 aforesaid, layers of high purity aluminum being sprayed on either side of the foil to a thickness of from 1 to 3 thousandths of an inch more or less.

The anode foil so sprayed is then subjected to a film forming operation which may be carried out in a conventional manner as by subjecting the foil to electrolysis as an anode in a solution of borax and boric acid, the electrolysis being continued until the leakage current has been reduced to the desired low value at a voltage in excess of the voltage for which the condenser is designed to operate. Electrodes of this type, when incorporated in condensers such as that illustrated have extremely high capacity per square inch of area of foil employed, are rugged and durable and are highly efficient because of the fact that the multitude of pierced openings through the electrodes permits the proper circulation of electrolyte and flow of ions so that all of the electrode surfaces may be completely and effectively utilized.

Fig. 8 illustrates a dry or paste type condenser of generally conventional construction embodying electrodes made according to my present invention. Such a condenser may comprise anode and cathode foils 40 and 41, respectively, provided with suitable terminals 42 and 43, respectively, and separated by the usual porous insulating spacers 44 and 45. The anode foil 40 may be produced in the manner described above in conjunction with the anode 33 shown in Fig. 6, while the cathode foil may be generally similar except that it is not necessary to use aluminum of quite as high purity in the production of cathodes and, further, the cathode need not be provided with a dielectric film in a condenser intended for direct current service. In a condenser intended for alternating current service, both electrodes would be of substantially identical construction and both would be provided with dielectric films.

The foils and spacers are assembled one on top of the other as shown and impregnated with a pasty or viscous electrolyte such as the urea-formaldehyde electrolyte described and claimed in Patent No. 2,095,966 issued October 19, 1937, to Joseph B. Brennan and Leona Marsh. The assembly is then rolled into substantially cylindrical form as shown at 46 and inserted in a suitable casing. Condensers of this type have extremely high capacity for their size and low resistance and power factor losses. The perforations enable the condenser to be impregnated with a larger quantity of electrolyte than is ordinarily possible to retain the electrolyte in proper position and permit flow of ions within the condenser. The cathode, being of large area, is very efficient and is not subject to loss in efficiency during use as the cathode will not be corroded or filmed even though the condenser is subject to a high alternating current ripple in service. The advantages of the sprayed cathode of large area are set out in greater detail in my Patent No. 2,104,019 aforesaid.

In Fig. 9 I have illustrated a storage battery or accumulator of the alkaline type embodying electrodes made according to my invention. This may comprise a container for electrolyte such as the rubber jar 50 which is filled with an alkaline electrolyte indicated at 51. The assembly of positive and negative plates and spacers shown generally at 52 is immersed in the electrolyte. This assembly may comprise positive plates 53 and negative plates 54 disposed alternately with spacers 55 of a porous insulating fabric material such as glass cloth disposed between them. The positive plates 53 may be made broadly in accordance with the disclosure of my Patent No. 2,251,913 aforesaid. Each plate preferably comprises a plurality of sheets 56 of nickel foil perforated in the manner described herein and sprayed with finely divided particles of molten nickel, the sheets being produced in the manner described in conjunction with the condenser anodes heretofore described except that the materials are different. To provide electrodes which will have high capacity and efficiency, and which will retain the active material in proper position, the sheets 56 are preferably welded together in intersecting lines 57 and 58, to provide a series of pockets or compartments 59 as shown. The perforations in adjacent sheets may be staggered as shown, or if desired, may be aligned.

The electrodes are provided with electrolytically formed coating of nickelous hydrate, the forming operation being carried out, for example, in a solution consisting of 3 parts of potassium ferrocyanide, 1 part of sodium chloride and 1 part of sodium hydroxide dissolved in 200 parts of water, the plate being polarized anodically at a current density of $\frac{1}{3}$ to $\frac{1}{2}$ ampere per square inch. Obviously, other means for providing the plates with proper surfaces of active material may be employed.

The cathode plates 54 may be formed of thin iron sheets and may likewise be perforated and provided with spray-deposited surfaces and welded together, the steps in the manufacture of the plates being similar to those heretofore described except for the differences in materials. The anode plates and cathode plates are assembled with suitable terminals 61 and 62, respectively, and then immersed in the alkaline electrolyte and subjected to the usual charging operation. The plates have advantageous characteristics when incorporated in storage batteries for substantially the same reasons that were outlined above in conjunction with condensers, namely, the exceedingly great surface area gives a large capacity battery for its size, resistance is reduced, efficiency increased because of the proper circulation of electrolyte and proper flow of ions within the cell and the life of the batteries is increased, for the spray-deposited coatings and active material will adhere to the surfaces of the sheets making up the plates throughout the life of the cell.

In the present specification, I have described preferred forms of my invention as applied to various types of electrolytic cells. Those skilled in the art will appreciate that various modifications and changes may be made in my invention without departing from the spirit and scope thereof, and that electrodes made according to my invention may be adapted to other types of electrolytic devices. It is therefore, to be understood that my patent is not limited by the foregoing description which is given by way of example only, or in any manner other than by the scope of the appended claims when given the range of equivalents to which my patent may be entitled.

I claim:

1. An electrode for electrolytic devices comprising a thin sheet of metal having therein from 800 to 1200 pierced openings per square inch providing passageways for the flow of ions therethrough, the openings being surrounded by minute projections composed of the material displaced by the piercing operation, substantially half of said projections being disposed on one side of said sheet and the remaining projections being disposed on the other side thereof, both sides of said sheet being provided with spray deposited, adherent layers of finely divided metallic particles.

2. An electrode for an alkaline storage cell comprising a thin strip of nickel having finely divided particles of nickel spray-deposited thereon, and provided with several hundred pierced openings per square inch therethrough, each of the pierced openings being surrounded by a projection composed of the material of the strip displaced by the operation of piercing the opening.

3. The method of making electrodes for electrolytic devices including the steps of piercing a plurality of openings in a strip of metal without removing any substantial amount of material therefrom, spray depositing layers of finely divided metallic particles on the surface of said strip and controlling the spraying operation so that passageways through said openings are present after the spraying operation is completed.

4. The method of making electrodes for electrolytic devices including the steps of piercing a plurality of openings in strips of metal without removing any substantial amount of material therefrom, spray depositing layers of finely divided metallic particles on the surfaces of said strips, controlling the spraying operation so that passageways through said openings are present after the spraying operation is completed, and welding a plurality of said strips together in face-to-face relationship by spaced welded areas.

5. The method of making electrodes for electrolytic devices including the steps of forming a plurality of openings in a strip of metal without removing any substantial amount of material therefrom by means of sharp pointed piercing tools projected through the strip from opposite sides thereof, spray depositing layers of finely divided metallic particles on both surfaces of said strip and controlling the spraying operation so that passageways through said openings are present after the spraying operation is completed.

6. The method of making electrodes for electrolytic devices including the steps of supporting a strip of thin sheet metal on a pad of rubber or similar material, piercing a plurality of openings through said strip by forcing a plurality of sharp needle like tools therethrough and into said pad, thereby forming projections surrounding said openings on one side of said strip, similarly piercing openings between the first openings from the opposite side of said strip, thereby forming projections on the opposite side of said strip, at least partially flattening said projections and thereafter spray depositing a thin layer of finely divided metallic particles on the surfaces of said strip.

7. The method of making electrodes for electrolytic devices including the steps of supporting a strip of thin sheet metal on a pad of rubber or similar material, piercing a plurality of openings through said strip by forcing a plurality of sharp needle like tools therethrough and into said pad, thereby forming projections surrounding said openings, at least partially flattening said projections, and thereafter spray depositing a thin layer of finely divided metallic particles on the surface of said strip on which said projections are formed.

8. The method of making electrodes for electrolytic devices including the steps of supporting a piece of thin sheet metal on a pad of rubber or similar material, piercing a plurality of openings through said piece by forcing a plurality of sharp needle like tools therethrough and into said pad, thereby forming projections surrounding said openings, at least partially flattening said projections, thereafter spray depositing a thin layer of finely divided metallic particles on the surface of said piece on which said projections are formed, and thereafter bending said strip into the desired shape.

9. An electrode for electrolytic devices comprising a flexible porous base composed of a thin sheet of metal having from 800 to 1200 openings per square inch and having a conductive layer of minute metallic particles thereon, and an electrolyte permeating said base and said layer.

10. An electrode for electrolytic devices comprising a plurality of contiguous layers of thin sheet metal provided with several hundred pierced openings per square inch therethrough, each of the pierced openings being surrounded by a projection composed of the material of the strip displaced by the piercing operation, and said layers having spray-deposited, adherent metallic coatings thereon.

11. An electrode according to claim 9 wherein there are conductive layers on both sides of said base, and the material of said conductive layers extends through said openings and thereby connects together the layers on opposite sides of said base and locks said layers to said base.

12. An electrode according to claim 9 wherein the thin sheet of metal is composed of iron.

13. An electrode according to claim 9 wherein the layers of thin sheet metal are composed of iron.

JOSEPH B. BRENNAN.

(References on following page)

REFERENCES CITED

The following references are of record in the file of this patent:

UNITED STATES PATENTS

| Number | Name | Date |
|---|---|---|
| 414,288 | Carpenter | Nov. 5, 1889 |
| 442,187 | Johnston | Dec. 9, 1890 |
| 489,115 | Arnold | Jan. 3, 1893 |
| 502,824 | Morse | Aug. 8, 1893 |
| 736,217 | Clark | Aug. 11, 1903 |
| 880,957 | Aylsworth | Mar. 3, 1908 |
| 1,034,883 | Creighton | Aug. 6, 1912 |
| 1,156,580 | Benjamin | Oct. 12, 1915 |
| 1,227,296 | Morrison | May 22, 1917 |
| 1,367,097 | Rottmann | Feb. 1, 1921 |
| 1,390,629 | Lyndon | Sept 13, 1921 |
| 1,402,751 | Edison | Jan. 10, 1922 |
| 1,437,189 | Mershon | Nov. 28, 1922 |
| 1,744,268 | Hammon | Jan. 21, 1930 |
| 1,752,963 | Pettinelli | Apr. 1, 1930 |
| 1,758,255 | Hudd | May 13, 1930 |
| 1,773,492 | Mershon | Aug. 19, 1930 |
| 1,798,287 | Ward | Mar. 31, 1931 |
| 1,886,997 | Wilkins | Nov. 8, 1932 |
| 2,104,018 | Brennan | Jan. 4, 1938 |
| 2,172,604 | Blackburn | Sept. 12, 1939 |
| 2,209,770 | Evers | July 30, 1940 |

FOREIGN PATENTS

| Number | Country | Date |
|---|---|---|
| 287 | Great Britain | 1883 |
| 5,569 | Great Britain | Mar. 23, 1900 |
| 446,887 | France | Oct. 14, 1912 |